(12) United States Patent
Kemp et al.

(10) Patent No.: US 10,810,020 B2
(45) Date of Patent: Oct. 20, 2020

(54) CONFIGURING A DEVICE USING AN AUTOMATED MANUAL PROCESS BRIDGE

(71) Applicant: EMC IP Holding Company LLC, Hopkinton, MA (US)

(72) Inventors: Walter Kemp, Round Rock, TX (US); Juan M. Martinez, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 79 days.

(21) Appl. No.: 16/163,792

(22) Filed: Oct. 18, 2018

(65) Prior Publication Data

US 2020/0125372 A1    Apr. 23, 2020

(51) Int. Cl.
| | |
|---|---|
| *G06F 9/445* | (2018.01) |
| *G06F 13/42* | (2006.01) |
| *G06F 13/10* | (2006.01) |
| *G06F 15/177* | (2006.01) |

(52) U.S. Cl.
CPC ........ *G06F 9/44505* (2013.01); *G06F 13/102* (2013.01); *G06F 13/105* (2013.01); *G06F 13/4282* (2013.01); *G06F 15/177* (2013.01); *G06F 2213/0042* (2013.01)

(58) Field of Classification Search
CPC . G06F 3/01; G06F 3/02; G06F 3/0219; G06F 3/0227; G06F 3/0233; G06F 3/0238; G06F 9/4413; G06F 9/4415; G06F 9/445; G06F 9/44505; G06F 9/4451; G06F 9/44536; G06F 11/2247; G06F 11/3051; G06F 13/102; G06F 13/105; G06F 13/4282; G06F 15/0225; G06F 15/177
See application file for complete search history.

(56) References Cited

U.S. PATENT DOCUMENTS

| | | | | |
|---|---|---|---|---|
| 4,763,252 | A * | 8/1988 | Rose ....................... | G06F 3/023 345/168 |
| 9,928,450 | B2 * | 3/2018 | Geva ................... | G06F 11/3414 |
| 2008/0098292 | A1 * | 4/2008 | Embry .................. | G06F 40/174 715/226 |
| 2009/0172219 | A1 * | 7/2009 | Mardiks .................. | G06F 9/445 710/67 |
| 2010/0082843 | A1 * | 4/2010 | Lu ........................... | G06F 21/56 710/10 |
| 2010/0205529 | A1 * | 8/2010 | Butin ...................... | G06F 9/453 715/704 |

(Continued)

OTHER PUBLICATIONS

Brody, Hartley. "USB Rubber Ducky Tutorial: The Missing Quickstart Guide to Running Your First Keystroke Payload Hack." Online Aug. 29, 2017. Retrieved from Internet Mar. 2, 2020. <https://blog.hartleybrody.com/rubber-ducky-guide/>. (Year: 2017).*

*Primary Examiner* — Thomas J. Cleary
(74) *Attorney, Agent, or Firm* — Krishnendu Gupta; Lesley Leonessa

(57) ABSTRACT

A method is used in configuring a device in computing environments. A configuration system retrieves device information from the device. The configuration system creates a configuration script for the device using the device information. The configuration system executes the configuration script to direct a peripheral device to transmit Human Interface Device (HID) events to the device, where the device performs the device configuration.

20 Claims, 4 Drawing Sheets

(56) References Cited

U.S. PATENT DOCUMENTS

| | | | |
|---|---|---|---|
| 2011/0010470 A1* | 1/2011 | Hulbert | G06Q 30/0185 710/13 |
| 2012/0243745 A1* | 9/2012 | Amintafreshi | G06F 11/3688 382/103 |
| 2014/0187173 A1* | 7/2014 | Partee | H04L 43/045 455/67.12 |
| 2014/0372983 A1* | 12/2014 | Presley | G06F 11/368 717/124 |
| 2016/0232194 A1* | 8/2016 | Abraham | G06Q 10/10 |
| 2018/0196741 A1* | 7/2018 | Qureshi | G06F 11/3692 |
| 2018/0370029 A1* | 12/2018 | Hall | G06F 11/3672 |
| 2019/0278238 A1* | 9/2019 | Ouano | G06F 9/44 |

* cited by examiner

CONFIGURING A DEVICE USING AN AUTOMATED MANUAL PROCESS BRIDGE

BACKGROUND

Technical Field

This application relates to configuring a device using an automated manual process bridge in computing environments.

Description of Related Art

Companies often provide their customers with system configuration for devices that the customers have purchased. These configurations may include, but are not limited to, Basic Input/Output System (BIOS) changes, Operating System (OS) customization, enterprise enrollment and/or configuring the customer's credentials. Often, an operator must manually enter the customer's credentials, and perform other steps using the device and the device's keyboard and mouse during the device configuration process.

SUMMARY OF THE INVENTION:

In accordance with one aspect of the invention is a method used in configuring a device in computing environments. A configuration system retrieves device information from the device. The configuration system creates a configuration script for the device using the device information, and executes the configuration script to direct a peripheral device to transmit Human Interface Device (HID) events to the device, where the device cannot be configured without the HID events. The device performs the device configuration.

In accordance with one aspect of the invention is a system used in configuring a device in computing environments. A configuration system retrieves device information from the device. The configuration system creates a configuration script for the device using the device information, and executes the configuration script to direct a peripheral device to transmit Human Interface Device (HID) events to the device, where the device cannot be configured without the HID events. The device performs the device configuration.

In accordance with another aspect of the invention, a computer program product comprising a computer readable medium is encoded with computer executable program code. The code enables execution across one or more processors for configuring a device in computing environments. A configuration system retrieves device information from the device. The configuration system creates a configuration script for the device using the device information, and executes the configuration script to direct a peripheral device to transmit Human Interface Device (HID) events to the device, where the device cannot be configured without the HID events. The device performs the device configuration.

BRIEF DESCRIPTION OF THE DRAWINGS:

Features and advantages of the present technique will become more apparent from the following detailed description of exemplary embodiments thereof taken in conjunction with the accompanying drawings in which.

Figure 1:
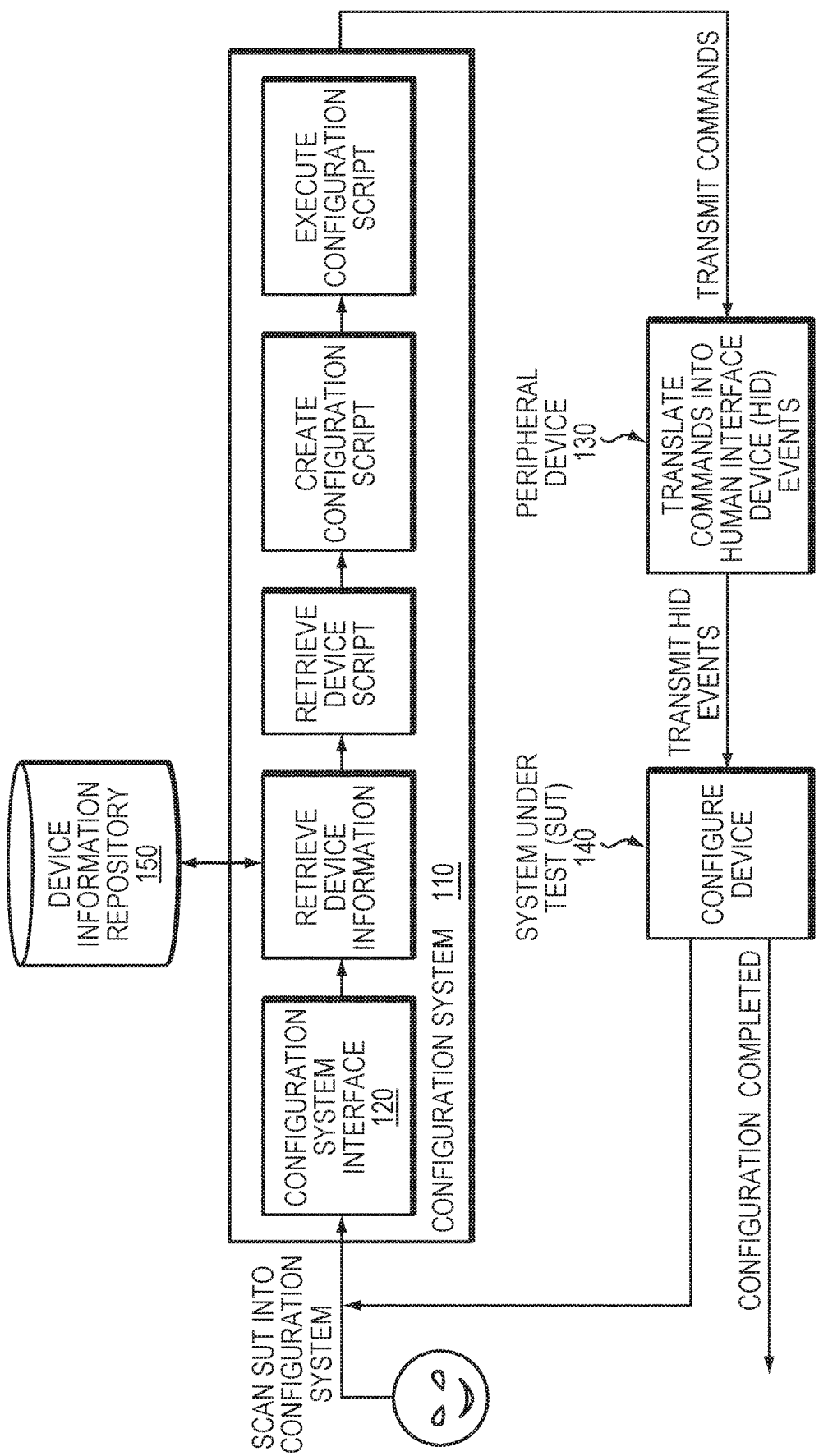
FIG. 1 an example of an embodiment of configuring a device in computing environments, in accordance with an embodiment of the present disclosure.

DETAILED DESCRIPTION OF EMBODIMENT(S):

Described below is a technique for use in configuring a device in computing environments, which technique may be used to provide, among other things, retrieving, from the device, device information, creating, by a configuration system, a configuration script for the device using the device information, and executing, by the configuration system, the configuration script to direct a peripheral device to transmit Human Interface Device (HID) events to the device, where the device performs the device configuration, and where the device cannot be configured without the HID events.

Manufactures often offer to configure devices that customer have purchased. This spares the customer from having to perform this function. For example, when a school system purchases large quantities of, for example, personal computers for the students, it is a helpful (and often times necessary) service for the manufacturer to perform the configuration on behalf of the students. This allows the customer, in this case, the students to unbox the personal computer, turn it on, enter the login and password information, and have the personal computer completely configured for the student's needs. The device configuration may include, but is not limited to, BIOS changes, OS customization, and enterprise enrollment.

Often times, these configuration procedures are not automated, because they require a computer operator to manually enter instructions into the device, using the device's keyboard and mouse to perform the configuration. Conventional technologies for manually configuring a device are prone to human error. For example, the operator may perform the wrong configuration for the device and/or the customer, and/or the customer's specifications. Conventional technologies for manually configuring a device cannot perform the device configuration at a consistent rate, since each operator may perform the device configuration at a different speed. Conventional technologies for manually configuring a plurality of different devices for a plurality of configurations run the risk that a human operator may be prone to more errors, especially each time the devices and/or configurations change. For example, in a manufacturing facility, an operator may be tasked with configuring multiple types of devices, with multiple configurations, and the devices/configurations may change throughout the operator's shift. Conventional technologies may provide an operator with a printout of the steps necessary to configure a device (i.e., the keystrokes, customer data such as login and password information, mouse clicks, instructions to wait for devices responses prior to proceeding to the next step, etc.), and rely on the operator's skill and speed to correctly and efficiently complete the configuration process. Conventional technologies that require an operator to enter the customer's login and password information cannot ensure that the login and password information is entered correctly (especially when the operator is entering different login and password information for each device that is configured), and cannot ensure that the login and password information is securely maintained. Conventional technologies that transmit keyboard events to a computer use static scripts, and cannot be dynamically modified. Conventional technologies for manually configuring a device are more expensive than if that manual process could be automated.

By contrast, in at least some implementations in accordance with the current technique as described herein, a configuration system retrieves device information from a device. The configuration system creates a configuration script for the device using the device information, and executes the configuration script to direct a peripheral device to transmit HID events to the device, where the device cannot be configured without the HID events. The device then performs the device configuration. In other words, embodiments disclosed herein dynamically create a customized script from a base script using customer specific configuration information, execute the customized script, and transmit the output of the customized script to a peripheral device that translates the output (i.e., the commands necessary to perform the configuration on the device) into HID events, where the configuration process cannot be completed without HID events.

Thus, embodiments disclosed herein replace the human interaction and manual instructions used to configure the device with an automated system. This reduces the cost of performing the device configuration because lower skilled employees are able to complete the configuration process (as opposed to the higher skilled employees needed to manually perform the configuration process, interacting with the device during the configuration process).

Automating the process also drastically reduces errors, such as configuring a device with the wrong configuration, and/or for the wrong customer. In an example embodiment, the device service tag is scanned into the configuration system, and the correct customized configuration script is created by the configuration system. The configuration system then executes the customized configuration script, and the peripheral device translates the output of the customize configuration script into HID events. The HID events are then transmitted to the device where the device performs the configuration.

Streamlining the process through automation also reduces the cost when manufacturers are charged for the configuration process by the number of "touches" an operator performs to configure the device. For example, conventional technologies for manually configuring a device may require 10 minutes of an operator's undivided attention, or even longer for an operator who performs the required steps more slowly. The operator may have to "touch" the device (i.e., perform keystrokes, mouse movements, mouse clicks, etc.), for example, 50 times. Embodiments disclosed herein streamline the configuration process such that, for example, an operator scans the service tag associated with a device, and the automated device configuration process can be initiated. In other words, the operator "touches" the device fewer times, and this reduces overall costs of configuring the device. Further, the automated process may be completed in a fraction of the time as compared to an operator manually performing the configuration process. While the automated configuration process is executing, the operator can move on to the next device and initiate the automated process on the next device. Thus, the operator is able to configure several devices simultaneously, while each devices is configured faster, with fewer touches, errors are drastically reduced, and customer privacy is preserved, for example, since the customer's private credentials are not available to the operators.

Embodiments disclosed herein take a plurality of configuration processes that may have different processing times (i.e., due to the length of the configuration process and/or the skill/efficiency of the operator), and create a uniform processing time for the plurality of configuration processes. Thus, one goal of embodiments disclosed herein is to provide a consistent efficient installation process for otherwise dynamically changing installation processes for a plurality of devices and a plurality of device configurations. In other words, embodiments disclosed herein provide automation of a process to provide a consistent process regardless of the operator, the device to be configured, the specific configuration details, etc. Embodiments disclosed herein provide a consistent, uniform process for the operator regardless of the device being configured or the specific configuration(s) to reduce operator error and increase operator efficiency.

Embodiments disclosed herein provide automation where automation tools do not exist (such as when HID events are necessary to complete the configuration process). The goals of the technique disclosed herein also include automating a device configuration process where the configuration process cannot be performed without HID events.

In at least some implementations in accordance with the current technique described herein, the use of configuring a device in computing environments can provide one or more of the following advantages: creating a consistent, efficient, simplified process for a variety of device configuration processes, reducing human error, increasing the efficiency of the process, increasing the consistency of the speed of the process, maintaining customer privacy by not exposing customer data, and allowing for rapid transition in the configuration process between different devices, different configurations, different customer specific details, and changes in the configuration processes.

In contrast to conventional technologies, in at least some implementations in accordance with the current technique as described herein, a method configures a device in computing environments. A configuration system retrieves device information from the device. The configuration system creates a configuration script for the device using the device information, and executes the configuration script to direct a peripheral device to transmit Human Interface Device (HID) events to the device, where the device cannot be configured without the HID events. The device performs the device configuration.

In an example embodiment of the current technique, each of a plurality of varied configuration processes are transformed into a simplified consistent process by the retrieving, creating, and executing.

In an example embodiment of the current technique, the configuration system receives the device information. Based on the device information, the configuration system retrieves a base script for the device.

In an example embodiment of the current technique, an interface associated with the configuration system receives the devices information, where the device information is scanned into the interface by a user.

In an example embodiment of the current technique, the configuration system integrates the device information into the base script to create the configuration script that is customized for the device.

In an example embodiment of the current technique, the configuration system retrieves at least one of a type of configuration to be performed on the device, and device owner specific details associated with the device.

In an example embodiment of the current technique, the configuration system integrates at least one of the type of configuration to be performed on the device, and the device owner specific details associated with the device into the base script to create the configuration script that is customized for the device.

In an example embodiment of the current technique, the configuration system transmits output of the configuration script from the configuration system to the peripheral device, where the peripheral device translates the output into the HID events.

In an example embodiment of the current technique, the method transmits the HID events from the peripheral device to the device using Universal Serial Bus (USB) communication.

In an example embodiment of the current technique, the HID events comprise a plurality of keystrokes, control characters, mouse events, and/or pauses.

FIG. 1 an example of an embodiment of configuring a device in computing environments, in accordance with an embodiment of the present disclosure. In an example embodiment, a user, such as an operator, scans the System Under Test (SUT) 140 (also referred to as "the device"), into the configuration system 110. The configuration system 110 may be, for example, a logic controller, engine, etc. that takes a generic template, such as a base script, and integrates, as needed, customer specific configurations, customer credentials, server settings, etc. The configuration system 110 receives the device information (i.e., the information associated with the system under test 140) through a configuration system interface 120 when the operator performs the scanning. The configuration system 110 retrieves the device information, and based on the device information, retrieves a device script. In an example embodiment, the device script is obtained from a device information repository 150, although the device script may be obtained from various other sources.

The device script is a base script that is appropriate for the model of the system under test 140, and for the type of configuration that is to be performed to configure the system under test 140. The configuration system 110 creates a configuration script that integrates the device information, the type of configuration, customer specific details, etc., into the script. In some embodiments, the configuration system 110 will also access the login and password information for the customer who will receive the system under test 140, so as to provide that login and password information during the system under test 140 configuration process. In an example embodiment, the type of configuration, customer specific details, customer login and password, etc. may also be retrieved from the device information repository 150, as well as from other sources. Thus, the same base script may work for a particular batch of systems under test 140, but the customer credentials may be different for each system under test 140. The configuration process is simplified, and quality of the configuration process is increased by dynamically obtaining the customer credentials, server settings, etc., for example, from the device information repository 150. This also maintains the customer's privacy, because the operator does not have access to the customer credentials, etc. Once the configuration system 110 creates the configuration script, the configuration system 110 executes the configuration script.

In an example embodiment, the configuration script includes a scripting language to develop the configuration sequence (i.e., the combination of keystrokes, mouse events, pauses, etc. that are required to perform the customized device configuration for the system under test 140). For example, the scripting language may handle sending keystrokes by sending a text string to the system under test 140 (for example, a user name and password). The scripting language may send control characters such as a command to send the "arrow keys", or other non-printable keys like "TAB", "Carriage Return", "Control-ALT-Delete", etc. The scripting language may send mouse events such as movements, clicks, drags, etc. The scripting language may send pauses that force the peripheral device 130 to wait an amount of time (i.e., a configurable amount of time) between commands, for example, allowing the system under test 140 to perform and complete one (or more) of the configuration steps. The scripting language may also include a template token that is a placeholder within the base script where substitutions of customer specific data is placed. Thus, the same base script may be shared across similar device configuration projects.

The output of the configuration script are the commands that configure the system under test 140. The configuration system 110 transmits the commands to the peripheral device 130 where the peripheral device 130 transmits the commands into the appropriate keystrokes (i.e., the HID events) to configure the system under test 140. In an example embodiment, the peripheral device 130 is a hardware device that accepts the output of the configuration script as input. In response, the peripheral device 130 produces, as output, the necessary signals to transmit the HID events. The peripheral device 130 enables the HID events, for example, the keyboard and mouse events, as though they are native devices. This eliminates the need for drivers and/or an operating system to be installed on the system under test 140 for the device configuration process to execute successfully. Thus, the peripheral device 130 may be used to configure the BIOS of the system under test 140. The peripheral device 130 may also be used with any operating system type. In an example embodiment, embodiments disclosed herein allow performance of BIOS changes in platforms where tools to manipulate the BIOS do not exist. Embodiments disclosed herein may also perform configuration changes on non-personal computer (PC) devices. The HID events may include keystrokes, control characters, mouse events, and/or pauses. The HID events are entered as input into the system under test 140, and the configuration is performed on the system under test 140 using the HID events. The configuration of the system under test 140 is then complete. For example, upon completion of the device configuration, the system under test 140 is enrolled into the management system of a school system prior to leaving the manufacturing facility that manufactured the system under test 140.

Figure 2:
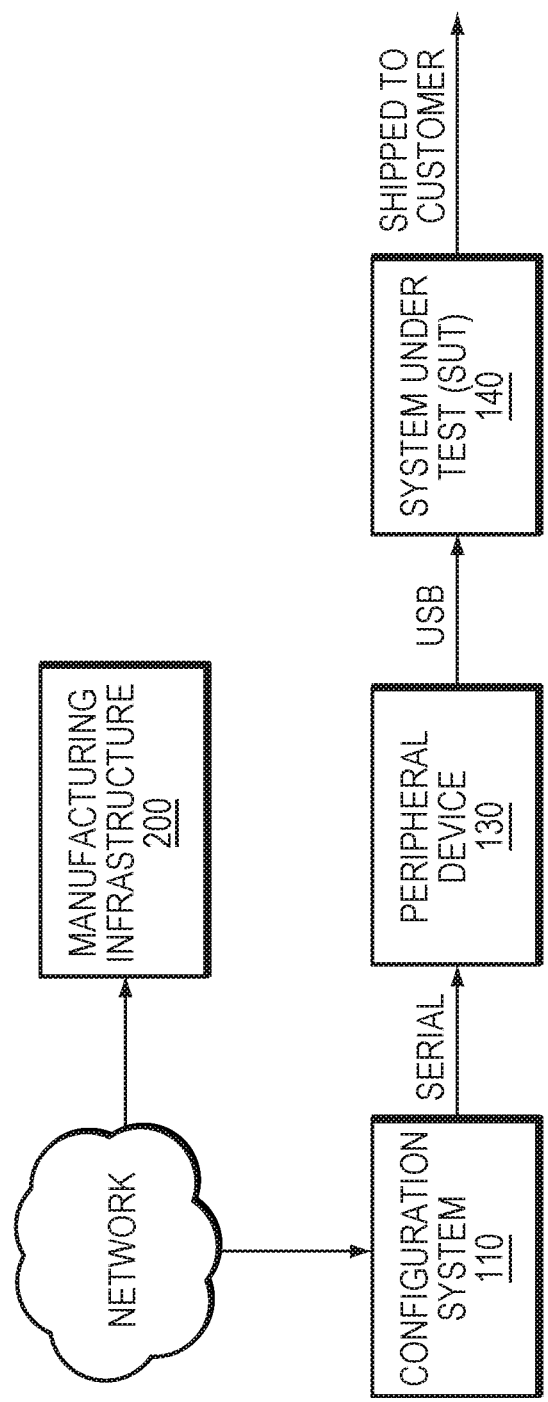
FIG. 2 illustrates an example process for configuring a device in computing environments in accordance with an example of the present disclosure.

FIG. 2 illustrates an example process for configuring a device in computing environments in accordance with an example of the present disclosure. The manufacturing infrastructure 200 and the configuration system 110 communicate with each other through a network. The configuration system 110 transmits the output of the configuration script to the peripheral device 130 through serial communication. The peripheral device 130 transmits the HID events (i.e., the output of the configuration script) to the system under test 140 through Universal Serial Bus (USB) communication. Once the configuration is completed, the system under test 140 is shipped to the customer.

Figure 3:
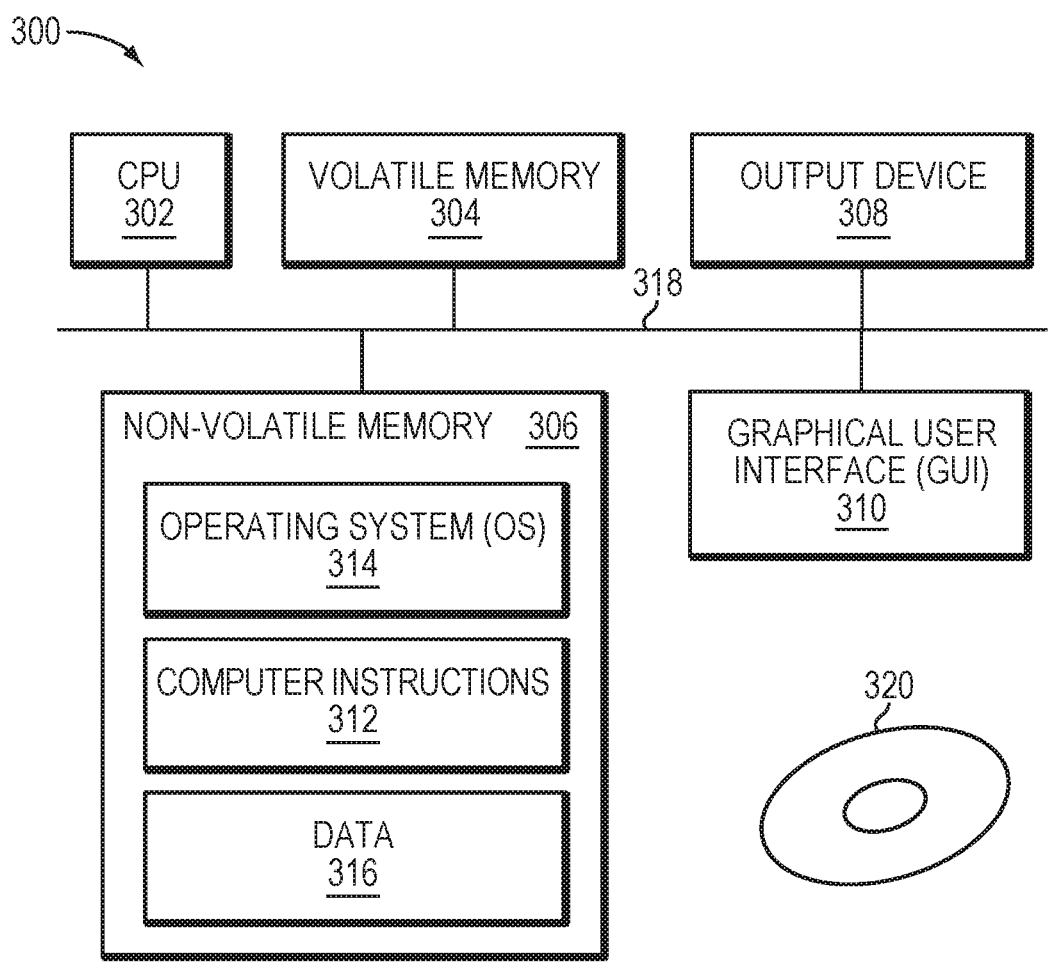
FIG. 3 is a block diagram of a computer, in accordance with an embodiment of the present disclosure.

FIG. 3 illustrates a block diagram of a computer 300 that can perform at least part of the processing described herein, according to one embodiment. The computer 300 may include a processor 302, a volatile memory 304, a non-volatile memory 306 (e.g., hard disk), an output device 308 and a graphical user interface (GUI) 310 (e.g., a mouse, a keyboard, a display, for example), each of which is coupled together by a bus 318. The non-volatile memory 306 may be configured to store computer instructions 312, an operating system 314, and data 316. In one example, the computer instructions 312 are executed by the processor 302 out of volatile memory 304. In one embodiment, an article 320 comprises non-transitory computer-readable instructions. In some embodiments, the computer 300 corresponds to a virtual machine (VM). In other embodiments, the computer 300 corresponds to a physical computer.

Figure 4:
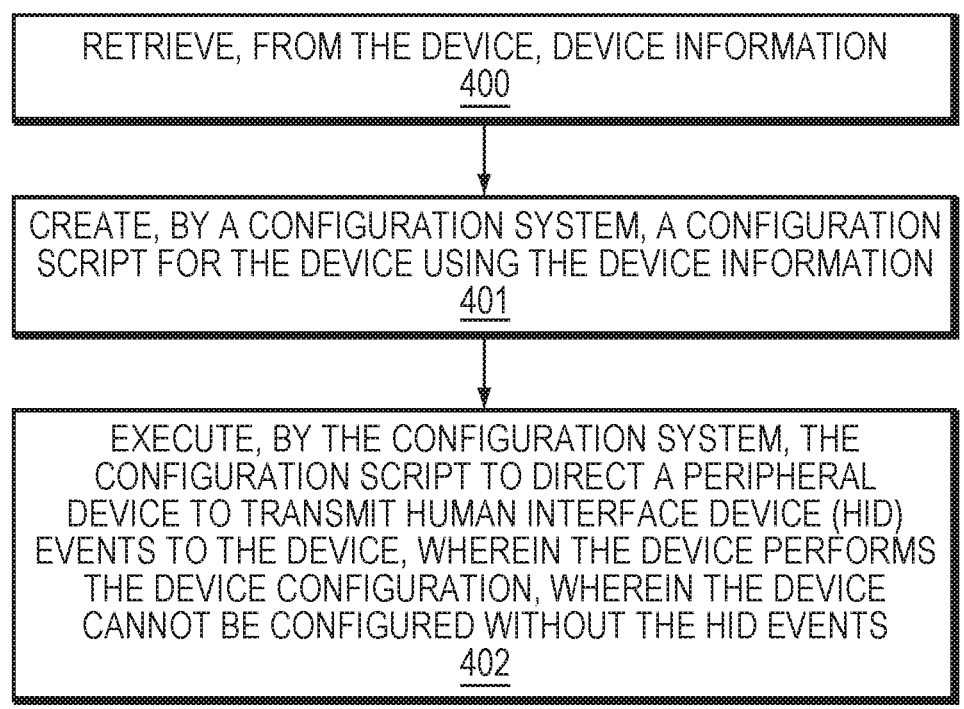
FIG. 4 is a flow diagram illustrating processes that may be used in connection with techniques disclosed herein.

Referring to FIG. 4, shown is a more detailed flow diagram illustrating configuring a device (i.e., the system under test 140) in computing environments. With reference also to FIGS. 1-3, the configuration system 110 retrieves device information from the device (Step 400). For example, a user, such as an operator using the configuration system 110, scans the device information into the configuration system interface 120, and the configuration system 110 receives the information through the configuration system interface 120. In an example embodiment, the configuration system 110 may access additional device information associated with the device from the device information repository 150. Based on the device information, the configuration system 110 retrieves a base script for the device. In an example embodiment, the configuration system 110 may retrieve the base script from the device information repository 150 or from any other source. For example, after the user scans, for example, a service tag associated with the system under test 140, the configuration system 110 retrieves the appropriate base script for the model of the system under test 140. In an example embodiment, based on the device information, the configuration system 110 retrieves a type of configuration to be performed on the device, and/or device owner specific details associated with the device. For example, the same models of systems under test 140 may have different configurations depending on, for example, the customer. The configuration system 110 may also obtain device owner (i.e., customer) specific details, such as login and password information.

The configuration system 110 creates a configuration script for the device using the device information (Step 401). The term "device information" may refer to the information that is scanned into the configuration system 110, the information retrieved from the device information repository 150, and information associated with the device and/or the configuration process retrieved from any other source. In an example embodiment, the configuration system 110 creates the configuration script by integrating device information (for example, the type of configuration to be performed on the device, and/or the device owner specific details associated with the device) into the base script. This creates the configuration script that is customized for the device (i.e., the system under test 140). It should be noted that the configuration system 110 may obtain device information from the device information repository 150, or any other source.

The configuration system 110 executes the configuration script to direct a peripheral device 130 to transmit Human Interface Device (HID) events to the device, where the system under test 140 performs the device configuration, and where the system under test 140 cannot be configured without the HID events (Step 402). In other words, the configuration system 110 transmits the output of the configuration script from the configuration system 110 to the peripheral device 130, where the peripheral device 130 translates the output into the HID events. The HID events may include, but are not limited to a plurality of keystrokes, control characters, mouse events, and/or pauses. Embodiments disclosed herein implement keystrokes and mouse event data, for example, movement of the mouse, and mouse clicks. This allows for automating configuration of systems where the configuration cannot be completed without the HID events. This allows for automating configuration of systems that require more than keyboard events for completion. For example, some configurations require keyboard and/or mouse events. Some configurations require a pause for the system under test 140 to respond before the next keystroke and/or mouse event may be entered. In an example embodiment, the peripheral device 130 transmits the HID events from the peripheral device 130 to the device using Universal Serial Bus (USB) communication.

In an example embodiment, each of a plurality of varied configuration processes are transformed into a simplified consistent process by the steps of retrieving the device information, creating the configuration script, and executing the configuration script to configure the device. Embodiments disclosed herein streamline the configuration process such that, for example, an operator scans the service tag associated with a device, and the automated device configuration process can be initiated. Embodiments disclosed herein take a plurality of configuration processes that may have different processing times (i.e., due to the length of the configuration process and/or the skill/efficiency of the operator), and create a uniform processing time for the plurality of configuration processes. Thus, embodiments disclosed herein is to provide a consistent efficient installation process for otherwise dynamically changing installation processes for a plurality of devices and a plurality of device configurations. In other words, embodiments disclosed herein provide automation of a process to provide a consistent process regardless of the operator, the device to be configured, the specific configuration details, etc. Embodiments disclosed herein provide a consistent, uniform process for the operator regardless of the device being configured or the specific configuration(s) to reduce operator error and increase operator efficiency.

There are several advantages to embodiments disclosed herein. For example, the method creates a consistent, efficient, simplified process for a variety of device configuration processes. The method reduces human error. The method increases the efficiency of the process. The method increases the consistency of the speed of the process. The method maintains customer privacy by not exposing customer data. The method allows for rapid transition in the configuration process between different devices, different configurations, different customer specific details, and changes in the configuration processes.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of configuring a device, the method comprising:
    retrieving, from the device, device information;
    creating, by a configuration system, a configuration script for the device using the device information, wherein the configuration script comprises a base configuration script that is customized with unique login information for each device; and
    executing, by the configuration system, the configuration script to direct a peripheral device to transmit Human Interface Device (HID) events to the device, wherein the device performs the device configuration, wherein the device cannot be configured without the HID events.

2. The method of claim 1, wherein each of a plurality of varied configuration processes are transformed into a simplified consistent process by the retrieving, creating, and executing.

3. The method of claim 1, wherein retrieving, from the device, device information comprises:
    receiving, by the configuration system the device information; and
    based on the device information, retrieving, by the configuration system, a base script for the device.

4. The method of claim 3, wherein receiving, by the configuration system, the device information comprises:
    receiving the device information, by an interface associated with the configuration system, wherein the device information is scanned into the interface by a user.

5. The method of claim 3, wherein creating, by the configuration system, the configuration script for the device using the device information comprises:
    integrating the device information into the base script to create the configuration script that is customized for the device.

6. The method of claim 3, further comprising:
    based on the device information, retrieving, by the configuration system, at least one of a type of configuration to be performed on the device, and device owner specific details associated with the device.

7. The method of claim 6, further comprising:
    integrating the at least one of the type of configuration to be performed on the device, and the device owner specific details associated with the device into the base script to create the configuration script that is customized for the device.

8. The method of claim 1, wherein executing, by the configuration system, the configuration script to direct the peripheral device to transmit the HID events to the device comprises:
    transmitting output of the configuration script from the configuration system to the peripheral device, wherein the peripheral device translates the output into the HID events.

9. The method of claim 1, wherein executing, by the configuration system, the configuration script to direct the peripheral device to transmit the HID events to the device comprises:
    transmitting the HID events from the peripheral device to the device using Universal Serial Bus (USB) communication.

10. The method of claim 1, wherein the HID events comprise a plurality of keystrokes, control characters, mouse events, and/or pauses.

11. A system for use in configuring a device in computing environments, the system comprising a processor configured to:
    retrieve, from the device, device information;
    create, by a configuration system, a configuration script for the device using the device information, wherein the configuration script comprises a base configuration script that is customized with unique login information for each device; and
    execute, by the configuration system, the configuration script to direct a peripheral device to transmit Human Interface Device (HID) events to the device, wherein the device performs the device configuration, wherein the device cannot be configured without the HID events.

12. The system of claim 11, wherein each of a plurality of varied configuration processes are transformed into a simplified consistent process by the retrieving, creating, and executing.

13. The system of claim 11, wherein the processor configured to retrieve, from the device, device information is further configured to:

receive, by the configuration system, the device information; and based on the device information, retrieve, by the configuration system, a base script for the device.

14. The system of claim 13, wherein the processor configured to receive, by the configuration system, the device information is further configured to:

receive the device information, by an interface associated with the configuration system, wherein the device information is scanned into the interface by a user.

15. The system of claim 13, wherein the processor configured to create, by the configuration system, the configuration script for the device using the device information is further configured to:

integrate the device information into the base script to create the configuration script that is customized for the device.

16. The system of claim 13, further configured to:

based on the device information, retrieve, by the configuration system, at least one of a type of configuration to be performed on the device, and device owner specific details associated with the device; and integrate the at least one of the type of configuration to be performed on the device, and the device owner specific details associated with the device into the base script to create the configuration script that is customized for the device.

17. The system of claim 11, wherein the processor configured to execute, by the configuration system, the configuration script to direct the peripheral device to transmit the HID events to the device is further configured to:

transmit output of the configuration script from the configuration system to the peripheral device, wherein the peripheral device translates the output into the HID events.

18. The system of claim 11, wherein the processor configured to execute, by the configuration system, the configuration script to direct the peripheral device to transmit the HID events to the device is further configured to:

transmit the HID events from the peripheral device to the device using Universal Serial Bus (USB) communication.

19. A computer program product for configuring a device in computing environments, the computer program product comprising:

a non-transitory computer readable storage medium having computer executable program code embodied therewith, the program code executable by a computer processor to:

retrieve, from the device, device information;

create, by a configuration system, a configuration script for the device using the device information, wherein the configuration script comprises a base configuration script that is customized with unique login information for each device; and execute, by the configuration system, the configuration script to direct a peripheral device to transmit Human Interface Device (HID) events to the device, wherein the device performs the device configuration, wherein the device cannot be configured without the HID events.

20. The computer program product of claim 19, wherein each of a plurality of varied configuration processes are transformed into a simplified consistent process by the retrieving, creating, and executing.

* * * * *